United States Patent
Nakaishi

(10) Patent No.: US 11,967,880 B2
(45) Date of Patent: Apr. 23, 2024

(54) POWER SUPPLY CIRCUIT AND BEARING DEVICE PROVIDED WITH SAME

(71) Applicant: DAIKIN INDUSTRIES, LTD., Osaka (JP)

(72) Inventor: Masaki Nakaishi, Osaka (JP)

(73) Assignee: Daikin Industries, Ltd., Osaka (JP)

(*) Notice: Subject to any disclaimer, the term of this patent is extended or adjusted under 35 U.S.C. 154(b) by 0 days.

(21) Appl. No.: 18/199,339

(22) Filed: May 18, 2023

(65) Prior Publication Data
US 2023/0291276 A1 Sep. 14, 2023

Related U.S. Application Data

(63) Continuation of application No. PCT/JP2021/042810, filed on Nov. 22, 2021.

(30) Foreign Application Priority Data

Nov. 20, 2020 (JP) .................................. 2020-193577

(51) Int. Cl.
*H02P 6/16* (2016.01)
*H02K 7/08* (2006.01)
(Continued)

(52) U.S. Cl.
CPC ............... *H02K 7/08* (2013.01); *H02P 23/00* (2013.01); *H02P 27/06* (2013.01)

(58) Field of Classification Search
CPC .................................. H02P 23/00; H02P 27/06
See application file for complete search history.

(56) References Cited

U.S. PATENT DOCUMENTS

| 3,937,533 A | 2/1976 | Veillette |
| 6,005,316 A | 12/1999 | Harris |

(Continued)

FOREIGN PATENT DOCUMENTS

| CN | 102843053 A | 12/2012 |
| CN | 107148521 A | 9/2017 |

(Continued)

OTHER PUBLICATIONS

International Preliminary Report of corresponding PCT Application No. PCT/JP2021/042810 dated Jun. 1, 2023.

(Continued)

*Primary Examiner* — Muhammad S Islam
(74) *Attorney, Agent, or Firm* — Global IP Counselors, LLP

(57) ABSTRACT

A power supply circuit supplies a current from a DC voltage source to first and second actuator coils to support an object in a non-contact manner by electromagnetic force. The power supply circuit includes a first leg connected to the DC voltage source, and a control unit. The first leg has first upper and lower arm switching elements connected in series. The control unit turns the switching elements on and off to control the current supplied to the actuator coils. A midpoint between the switching elements is connected to a connection point between the actuator coils. A freewheeling diode is provided for each of the switching elements in parallel. The control unit performs control so that the current flows through the first actuator coil in a direction toward the connection point, and the current flows through the second actuator coil in a direction coming out of the connection point.

14 Claims, 7 Drawing Sheets

(51) Int. Cl.
  *H02P 23/00*   (2016.01)
  *H02P 27/06*   (2006.01)

(56)  References Cited

U.S. PATENT DOCUMENTS

| | | | |
|---|---|---|---|
| 9,013,136 B2* | 4/2015 | Yamagiwa | H02K 21/16 310/156.56 |
| 2009/0251831 A1* | 10/2009 | Shiba | H02P 27/06 361/30 |
| 2010/0211223 A1* | 8/2010 | Ikeda | H02P 27/06 324/139 |
| 2017/0307012 A1 | 10/2017 | Jiang et al. | |
| 2021/0115929 A1 | 4/2021 | Nakazawa et al. | |

FOREIGN PATENT DOCUMENTS

| | | |
|---|---|---|
| CN | 110574260 A | 12/2019 |
| JP | 2003-139136 A | 5/2003 |

OTHER PUBLICATIONS

International Search Report of corresponding PCT Application No. PCT/JP2021/042810 dated Jan. 13, 2022.
European Search Report of corresponding EP Application No. 21 89 4770.3 dated Jan. 17, 2024.

* cited by examiner

POWER SUPPLY CIRCUIT AND BEARING DEVICE PROVIDED WITH SAME

CROSS-REFERENCE TO RELATED APPLICATIONS

This is a continuation of International Application No. PCT/JP2021/042810 filed on Nov. 22, 2021, which claims priority to Japanese Patent Application No. 2020-193577, filed on Nov. 20, 2020. The entire disclosures of these applications are incorporated by reference herein.

BACKGROUND

Technical Field

The present disclosure relates to a power supply circuit that supplies a current from a DC voltage source to first and second actuator coils so that the first and second actuator coils support an object by an electromagnetic force in a non-contact manner, and a bearing device including the power supply circuit.

Background Art

Japanese Unexamined Patent Publication No. 2003-139136 discloses a bearing device including a power supply circuit that supplies a current from a DC voltage source to a plurality of actuator coils so that the actuator coils support an object in a non-contact manner by an electromagnetic force. The power supply circuit of this bearing device includes an H-bridge circuit for each actuator coil. The H-bridge circuit includes two legs, and each leg includes an upper-arm switching element and a lower-arm switching element connected in series to each other.

SUMMARY

A first aspect of the present disclosure is directed to a power supply circuit that supplies a current from a DC voltage source to first and second actuator coils so that the first and second actuator coils support an object in a non-contact manner by an electromagnetic force. The power supply circuit includes a first leg and a control unit. The first leg has a first upper-arm switching element and a first lower-arm switching element connected in series to each other. The first leg is connected to the DC voltage source. The control unit is configured to turn the first upper-arm switching element and the first lower-arm switching element on and off to control the current supplied to the first and second actuator coils. The first and second actuator coils are connected in series to each other. A midpoint between the first upper-arm switching element and the first lower-arm switching element is connected to a connection point between the first and second actuator coils. A freewheeling diode is provided for each of the first upper-arm switching element and the first lower-arm switching element in parallel. The control unit is configured to perform control so that the current flows through the first actuator coil in a direction toward the connection point, and the current flows through the second actuator coil in a direction coming out of the connection point.

BRIEF DESCRIPTION OF THE DRAWINGS

FIG. 4A is a circuit diagram of the first power supply circuit when only a first upper-arm switching element, a first lower-arm switching element, a second upper-arm switching element, and a third lower-arm switching element are turned on.

FIG. 4B is a diagram corresponding to FIG. 4A, illustrating the first power supply circuit when only the first upper-arm switching element, the second upper-arm switching element, and the third lower-arm switching element are turned on.

FIG. 4C is a diagram corresponding to FIG. 4A, illustrating the first power supply circuit when only the first upper-arm switching element and the third lower-arm switching element are turned on.

FIG. 4D is a diagram corresponding to FIG. 4A, illustrating the first power supply circuit when only the first lower-arm switching element, the second upper-arm switching element, and the third lower-arm switching element are turned on.

FIG. 4E is a diagram corresponding to FIG. 4A, illustrating the first power supply circuit when only the second upper-arm switching element and the third lower-arm switching element are turned on.

FIG. 4F is a diagram corresponding to FIG. 4A, illustrating the first power supply circuit when only the third lower-arm switching element is turned on.

FIG. 4G is a diagram corresponding to FIG. 4A, illustrating the first power supply circuit when only the first lower-arm switching element and the second upper-arm switching element are turned on.

FIG. 4H is a diagram corresponding to FIG. 4A, illustrating the first power supply circuit when only the second upper-arm switching element is turned on.

DETAILED DESCRIPTION OF EMBODIMENT(S)

An embodiment of the present disclosure will be described below with reference to the drawings. The embodiment below is merely exemplary one in nature and is not intended to limit the scope, applications, or use of the present invention.

Figure 1:
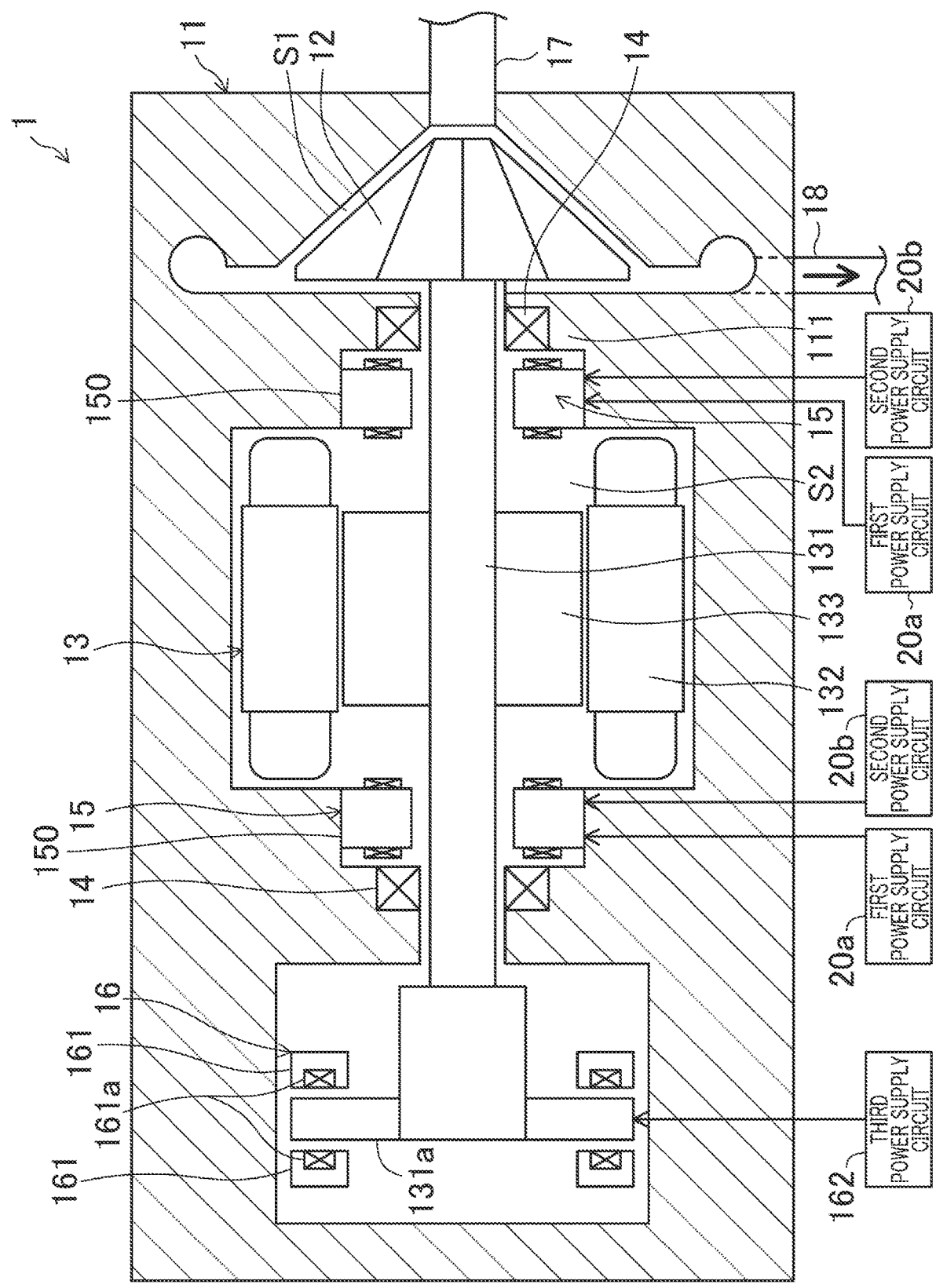
FIG. 1 is a schematic diagram illustrating a configuration of a turbo compressor including radial magnetic bearing devices and thrust magnetic bearing devices of a first embodiment of the present disclosure.

FIG. 1 shows a turbo compressor (1). The turbo compressor (1) is provided in a refrigerant circuit (not shown) and performs a refrigeration cycle to compress a refrigerant. The turbo compressor (1) includes a casing (11), an impeller (12), a motor (13), a pair of touchdown bearings (14), a pair of radial magnetic bearing devices (15) and a pair of thrust magnetic bearing devices (16) of the first embodiment of the present disclosure, and a power converter (not shown).

The casing (11) is formed in a substantially cylindrical shape and is arranged with its cylindrical axis oriented horizontally. Space in the casing (11) is axially divided by a wall portion (111) into an impeller chamber (S1) that houses the impeller (12) and a motor chamber (S2) that houses the motor (13). A suction pipe (17) and a discharge pipe (18) are connected to the impeller chamber (S1).

The impeller (12) has a plurality of blades and has a substantially conical outer shape. The impeller (12) is housed in the impeller chamber (S1).

The motor (13) is, for example, a permanent magnet synchronous motor or a bearingless motor. The motor (13) includes a drive shaft (131) as an object, a stator (132), and a rotor (133). One end of the drive shaft (131) is fixed to a center of a larger face of the impeller (12). A disk portion (131*a*) is formed to project from the other end of the drive shaft (131). The rotor (133) is fixed to the drive shaft (131), and the stator (132) is fixed to the casing (11). The rotor (133) and the stator (132) are housed in the motor chamber (S2). The motor (13) is rotationally driven by power supplied from a power converter which is not shown.

One of the pair of touchdown bearings (14) is provided on the drive shaft (131) to be located near the impeller (12), and the other touchdown bearing (14) is provided on the drive shaft (131) to be located near the disc portion (131*a*). The touchdown bearings (14) are configured to support the drive shaft (131) when the motor (13) is non-energized (i.e., when the drive shaft (131) is not levitated).

Each of the radial magnetic bearing devices (15) has a radial magnetic bearing body (150) and first and second power supply circuits (20*a*, 20*b*). The radial magnetic bearing bodies (150) are fixed to an inner peripheral wall of the casing (11) on both axial sides of the stator (132) and rotor (133) of the motor (13).

Figure 2:
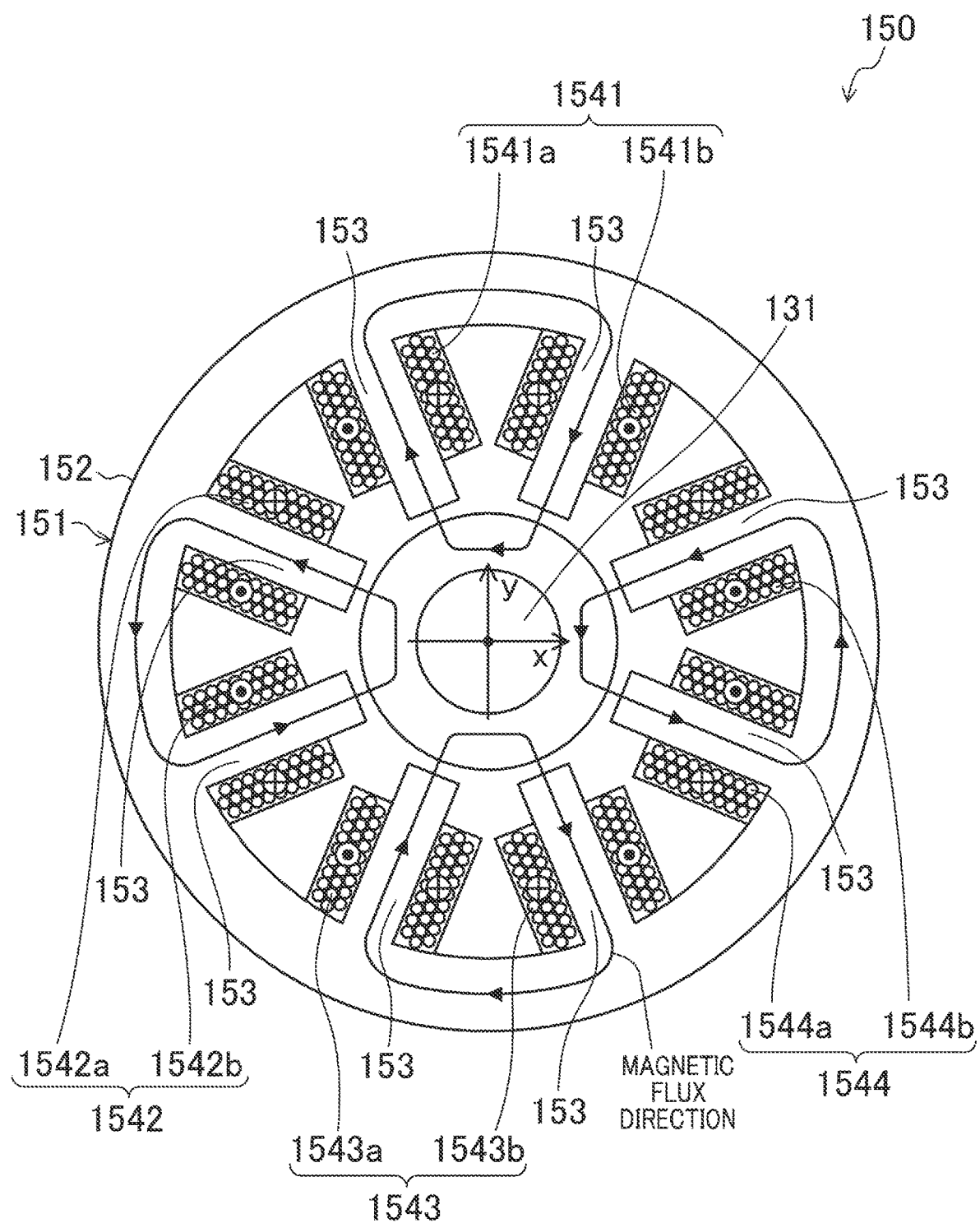
FIG. 2 is a schematic cross-sectional view of a radial magnetic bearing body.

FIG. 2 is a transverse cross-sectional view illustrating a configuration example of the radial magnetic bearing body (150). As illustrated in FIG. 2, the radial magnetic bearing body (150) is configured as a heteropolar magnetic bearing. The radial magnetic bearing body (150) includes a stator (151) having a back yoke (152) and eight teeth (153), and eight coils (1541*a*, 1541*b*, 1542*a*, 1542*b*, 1543*a*, 1543*b*, 1544*a*, 1544*b*), each of which is wound about a corresponding one of the eight teeth (153). The eight coils (1541*a*, 1541*b*, 1542*a*, 1542*b*, 1543*a*, 1543*b*, 1544*a*, 1544*b*) are divided into pairs (1541*a*, 1541*b*, 1542*a*, 1542*b*, 1543*a*, 1543*b*, 1544*a*, 1544*b*), and each pair including two coils that are wound about a pair of teeth (153) adjacent to each other in the circumferential direction are connected to each other. The pairs of coils serve as radial magnetic bearing coils A to D (1541 to 1544), which are examples of first and second actuator coils. The radial magnetic bearing coils A to D (1541 to 1544) are sequentially arranged along the circumference in the counterclockwise direction in FIG. 2. The winding directions of the radial magnetic bearing coils A to D (1541 to 1544) and the directions of the currents flowing through the radial magnetic bearing coils A to D (1541 to 1544) are set so that magnetic flux is generated in the directions of arrows shown in FIG. 2. Each of the radial magnetic bearing coils A to D (1541 to 1544) supports a radial load of the drive shaft (131) in a non-contact manner by an electromagnetic force generated when the current is applied to each of the radial magnetic bearing coils A to D (1541 to 1544). The radial magnetic bearing coil A (1541) and the radial magnetic bearing C (1543) are arranged to face each other so that the electromagnetic forces of the radial magnetic bearing coils A and C (1541, 1543) act in opposite directions during control by a control unit (23) of the first power supply circuit (20*a*) to be described later. The radial magnetic bearing coil B (1542) and the radial magnetic bearing coil D (1544) are arranged to face each other so that the electromagnetic forces of the radial magnetic bearing coils B and D (1542, 1544) act in opposite directions during control by a control unit (23) of the second power supply circuit (20*b*) to be described later.

The first power supply circuit (20*a*) supplies a current from a DC voltage source (2) to the radial magnetic bearing coils A and C (1541, 1543) so that the radial magnetic bearing coils A and C (1541, 1543) support the drive shaft (131) in a non-contact manner by the electromagnetic forces.

The second power supply circuit (20*b*) supplies a current from the DC voltage source (2) to the radial magnetic bearing coils B and D (1542, 1544) so that the radial magnetic bearing coils B and D (1542, 1544) support the drive shaft (131) in a non-contact manner by the electromagnetic forces.

Figure 3:
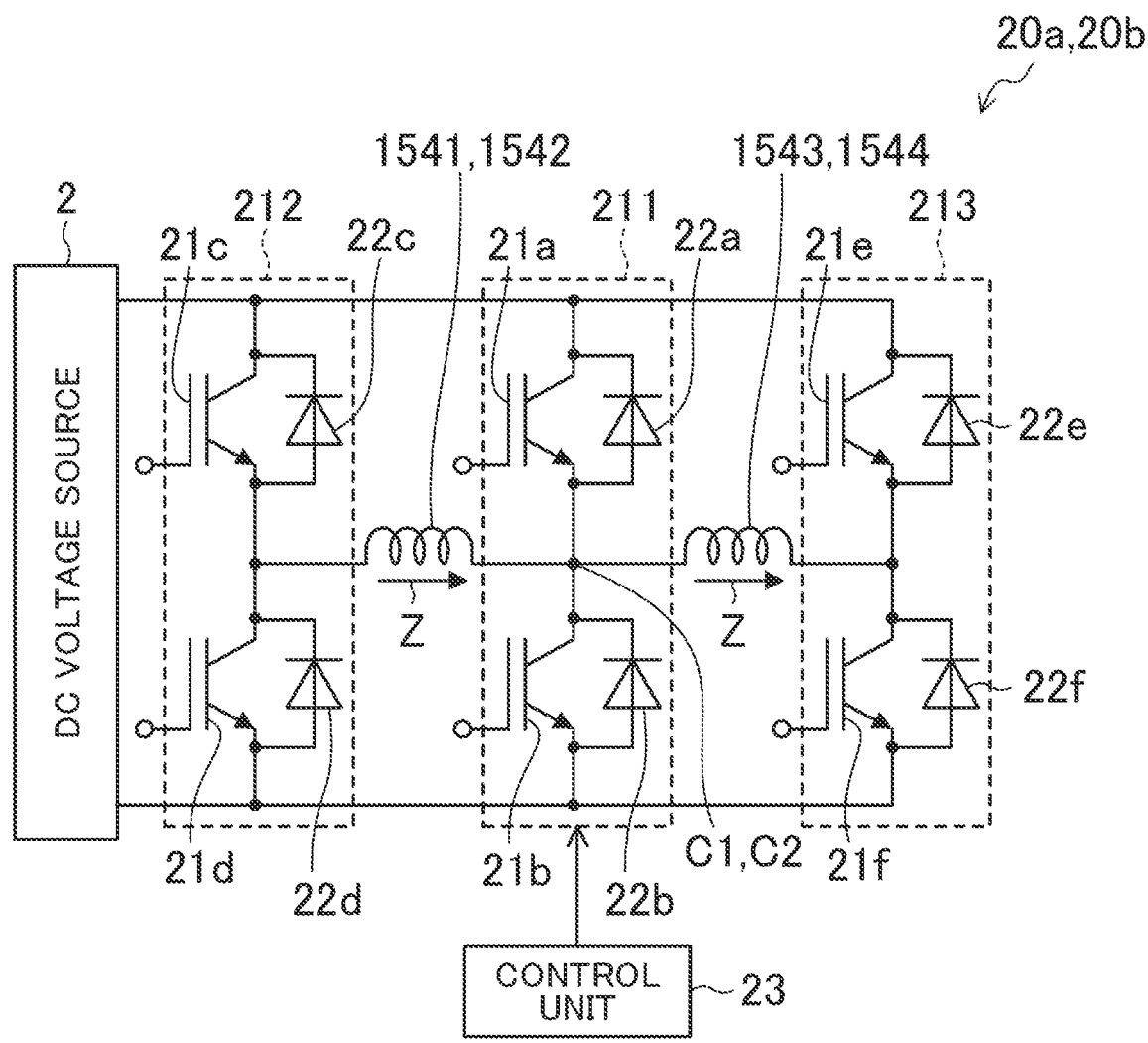
FIG. 3 is a circuit diagram illustrating a configuration of first and second power supply circuits.

Specifically, as illustrated in FIG. 3, each of the first and second power supply circuits (20*a*, 20*b*) includes first to third legs (211, 212, 213) and a control unit (23).

The first leg (211) includes a first upper-arm switching element (21*a*), a first lower-arm switching element (21*b*), a first upper-arm freewheeling diode (22*a*), and a first lower-arm freewheeling diode (22*b*). The first upper-arm switching element (21*a*) and the first lower-arm switching element (21*b*) are connected in series to each other. The first upper-arm freewheeling diode (22*a*) is connected to (provided for) the first upper-arm switching element (21*a*) in parallel, and the first lower-arm freewheeling diode (22*b*) is connected to (provided for) the first lower-arm switching element (21*b*) in parallel. The first upper-arm freewheeling diode (22*a*) has a cathode connected to the positive side of the DC voltage source (2) and an anode connected to the first lower-arm switching element (21*b*). The first lower-arm freewheeling diode (22*b*) has an anode connected to the negative side of the DC voltage source (2) and a cathode connected to the first upper-arm switching element (21*a*). The first leg (211) is thus connected to the DC voltage source (2).

The second leg (212) includes a second upper-arm switching element (21*c*), a second lower-arm switching element (21*d*), a second upper-arm freewheeling diode (22*c*), and a second lower-arm freewheeling diode (22*d*). The second upper-arm switching element (21*c*) and the second lower-arm switching element (21*d*) are connected in series to each other. The second upper-arm freewheeling diode (22*c*) is connected to (provided for) the second upper-arm switching element (21*c*) in parallel, and the second lower-arm freewheeling diode (22*d*) is connected to (provided for) the second lower-arm switching element (21*d*) in parallel. The second upper-arm freewheeling diode (22*c*) has a cathode connected to the positive side of the DC voltage source (2) and an anode connected to the second lower-arm switching element (21*d*). The second lower-arm freewheeling diode (22*d*) has an anode connected to the negative side of the DC voltage source (2) and a cathode connected to the second upper-arm switching element (21*c*). That is, the second upper-arm switching element (21*c*) is connected in series to the second lower-arm freewheeling diode (22*d*) via the cathode of the second lower-arm freewheeling diode (22*d*). The second leg (212) is thus connected to the DC voltage source (2).

The third leg (213) includes a third upper-arm switching element (21*e*), a third lower-arm switching element (210, a third upper-arm freewheeling diode (22*e*), and a third lower-arm freewheeling diode (22f). The third upper-arm switching element (21e) and the third lower-arm switching element (21f) are connected in series to each other. The third upper-arm freewheeling diode (22e) is connected to (provided for) the third upper-arm switching element (21e) in parallel, and the third lower-arm freewheeling diode (22f) is connected to (provided for) the third lower-arm switching element (21f) in parallel. The third upper-arm freewheeling diode (22e) has a cathode connected to the positive side of the DC voltage source (2) and an anode connected to the third lower-arm switching element (21f). That is, the third lower-arm switching element (21f) is connected in series to the third upper-arm freewheeling diode (22e) via the anode of the third upper-arm freewheeling diode (22e). The third lower-arm freewheeling diode (22f) has an anode connected to the negative side of the DC voltage source (2) and a cathode connected to the third upper-arm switching element (21e). The third leg (213) is thus connected to the DC voltage source (2).

The first to third legs (211 to 213) configured as described above are housed in a single package. As the first to third legs (211 to 213), three legs housed in a package of an IGBT module for three-phase alternating current are used.

In the first power supply circuit (20a), the radial magnetic bearing coil A (1541) is connected between a midpoint between the first upper-arm switching element (21a) and the first lower-arm switching element (21b) and a midpoint between the second upper-arm switching element (21c) and the second lower-arm freewheeling diode (22d). In the first power supply circuit (20a), the radial magnetic bearing coil C (1543) is connected between the midpoint between the first upper-arm switching element (21a) and the first lower-arm switching element (21b) and a midpoint between the third upper-arm freewheeling diode (22e) and the third lower-arm switching element (21f). That is, the midpoint between the first upper-arm switching element (21a) and the first lower-arm switching element (21b) is connected to a connection point (C1) between the radial magnetic bearing coils A and C (1541, 1543).

In the second power supply circuit (20b), the radial magnetic bearing coil B (1542) is connected between a midpoint between the first upper-arm switching element (21a) and the first lower-arm switching element (21b) and a midpoint between the second upper-arm switching element (21c) and the second lower-arm freewheeling diode (22d). In the second power supply circuit (20b), the radial magnetic bearing coil D (1544) is connected between the midpoint between the first upper-arm switching element (21a) and the first lower-arm switching element (21b) and a midpoint between the third upper-arm freewheeling diode (22e) and the third lower-arm switching element (21f). That is, the midpoint between the first upper-arm switching element (21a) and the first lower-arm switching element (21b) is connected to a connection point (C2) between the radial magnetic bearing coils B and D (1542, 1544).

In FIG. 3, arrows Z indicate the direction of the current flowing through the radial magnetic bearing coils A to D (1541 to 1544). The control unit (23) performs control so that the current flows through the radial magnetic bearing coils A and B (1541, 1542) in a direction toward the connection point (C1, C2) and the current flows through the radial magnetic bearing coils C and D (1543, 1544) in a direction coming out of the connection point (C1, C2).

Specifically, the control unit (23) of the first power supply circuit (20a) performs eight types of current control shown in FIGS. 4B to 4I. The control unit (23) of the second power supply circuit (20b) also performs the same eight types of current control. The control unit (23) of each of the first and second power supply circuits (20a, 20b) performs any one of the eight types of current control selected in accordance with a value detected by a gap sensor (not shown) capable of detecting a gap between the stator (132) and the rotor (133) so that the drive shaft (131) of the motor (13) is located at a desired position.

Figure 4A:
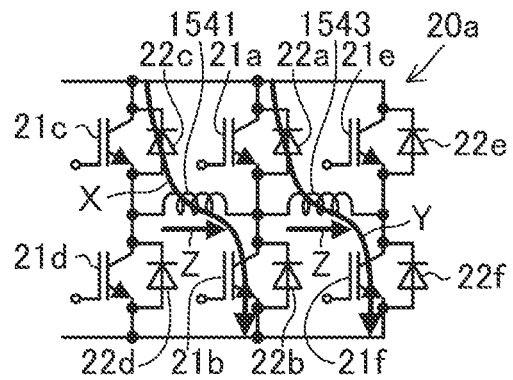

When the first upper-arm switching element (21a) and the first lower-arm switching element (21b) are simultaneously turned on as illustrated in FIG. 4A, a short circuit occurs between the positive and negative sides of the DC voltage source (2). Thus, the control unit (23) does not simultaneously turn on the first upper-arm switching element (21a) and the first lower-arm switching element (21b).

In the current control shown in FIGS. 4B to 4I, the control unit (23) always turns off the second lower-arm switching element (21d) and the third upper-arm switching element (21e).

Figure 4B:
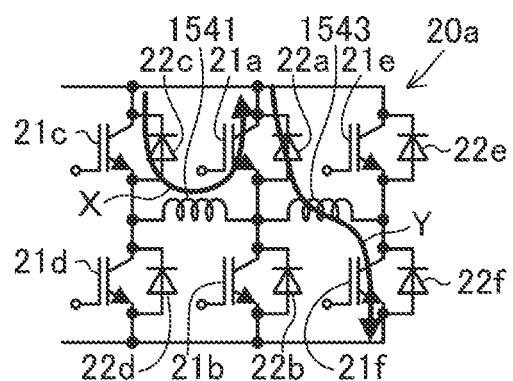

When it is required to maintain the current flowing through the radial magnetic bearing coil A (1541) and increase the current flowing through the radial magnetic bearing coil C (1543), the control unit (23) turns on the first upper-arm switching element (21a), the second upper-arm switching element (21c), and the third lower-arm switching element (21f) and turns off the first lower-arm switching element (21b) as illustrated in FIG. 4B. This allows the current to flow in the directions indicated by arrows X and Y in FIG. 4B, maintaining the current flowing through the radial magnetic bearing coil A (1541) and increasing the current flowing through the radial magnetic bearing coil C (1543).

Figure 4C:
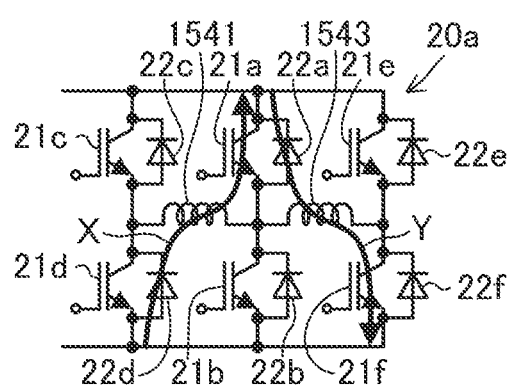

When it is required to reduce the current flowing through the radial magnetic bearing coil A (1541) and increase the current flowing through the radial magnetic bearing coil C (1543), the first upper-arm switching element (21a) and the third lower-arm switching element (21f) are turned on, and the first lower-arm switching element (21b) and the second upper-arm switching element (21c) are turned off as illustrated in FIG. 4C. This allows the current to flow in the directions indicated by arrows X and Y in FIG. 4C, reducing the current flowing through the radial magnetic bearing coil A (1541) and increasing the current flowing through the radial magnetic bearing coil C (1543).

Figure 4D:
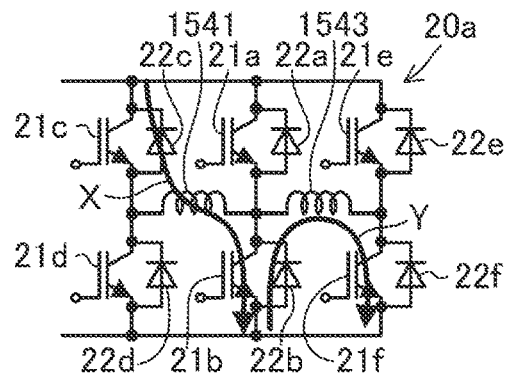

When it is required to increase the current flowing through the radial magnetic bearing coil A (1541) and maintain the current flowing through the radial magnetic bearing coil C (1543), the first lower-arm switching element (21b), the second upper-arm switching element (21c), and the third lower-arm switching element (21f) are turned on, and the first upper-arm switching element (21a) is turned off as illustrated in FIG. 4D. This allows the current to flow in the directions indicated by arrows X and Y in FIG. 4D, increasing the current flowing through the radial magnetic bearing coil A (1541) and maintaining the current flowing through the radial magnetic bearing coil C (1543).

Figure 4E:
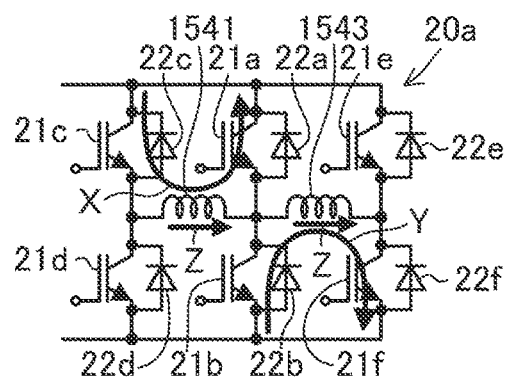

When it is required to maintain both the current flowing through the radial magnetic bearing coil A (1541) and the current flowing through the radial magnetic bearing coil C (1543), the second upper-arm switching element (21c) and the third lower-arm switching element (21f) are turned on, and the first upper-arm switching element (21a) and the first lower-arm switching element (21b) are turned off as illustrated in FIG. 4E. This allows the current to flow in the directions indicated by arrows X and Y in FIG. 4E, maintaining both the current flowing through the radial magnetic bearing coil A (1541) and the current flowing through the radial magnetic bearing coil C (1543).

Figure 4F:
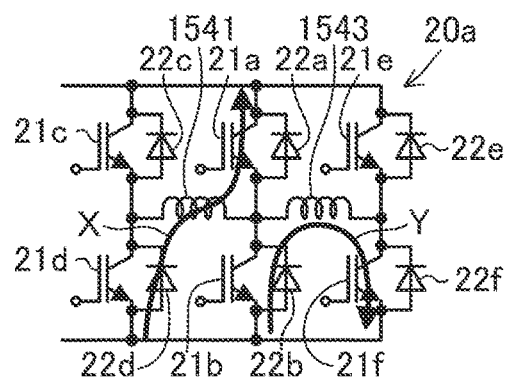

When it is required to reduce the current flowing through the radial magnetic bearing coil A (1541) and maintain the current flowing through the radial magnetic bearing coil C (1543), the third lower-arm switching element (210 is turned on, and the first upper-arm switching element (21*a*), the first lower-arm switching element (21*b*), the second upper-arm switching element (21*c*) are turned off as illustrated in FIG. 4F. This allows the current to flow in the directions indicated by arrows X and Y in FIG. 4F, reducing the current flowing through the radial magnetic bearing coil A (1541) and maintaining the current flowing through the radial magnetic bearing coil C (1543).

Figure 4G:
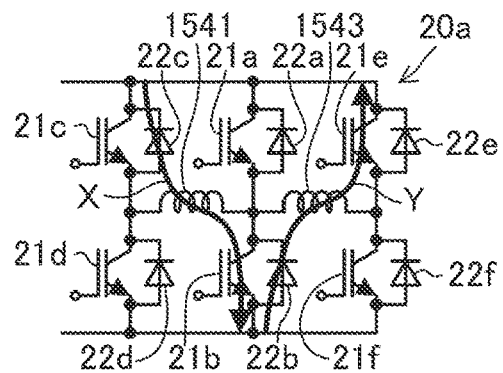

When it is required to increase the current flowing through the radial magnetic bearing coil A (1541) and reduce the current flowing through the radial magnetic bearing coil C (1543), the first lower-arm switching element (21*b*) and the second upper-arm switching element (21*c*) are turned on, and the first upper-arm switching element (21*a*) and the third lower-arm switching element (210 are turned off as illustrated in FIG. 4G. This allows the current to flow in the directions indicated by arrows X and Y in FIG. 4G, increasing the current flowing through the radial magnetic bearing coil A (1541) and reducing the current flowing through the radial magnetic bearing coil C (1543).

Figure 4H:
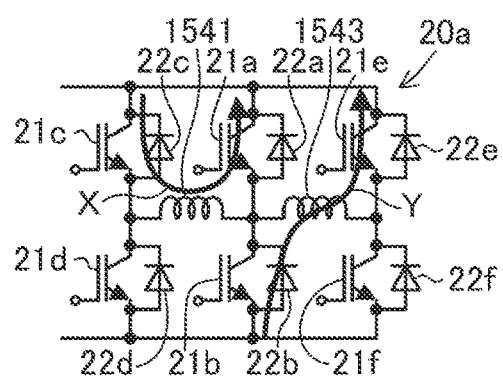

When it is required to maintain the current flowing through the radial magnetic bearing coil A (1541) and reduce the current flowing through the radial magnetic bearing coil C (1543), the second upper-arm switching element (21*c*) is turned on, and the first upper-arm switching element (21*a*), the first lower-arm switching element (21*b*), and the third lower-arm switching element (210 are turned off as illustrated in FIG. 4H. This allows the current to flow in the directions indicated by arrows X and Y in FIG. 4H, maintaining the current flowing through the radial magnetic bearing coil A (1541) and reducing the current flowing through the radial magnetic bearing coil C (1543).

Figure 4I:
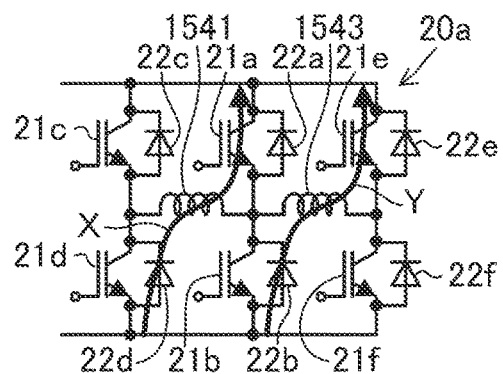
FIG. 4I is a diagram corresponding to FIG. 4A, illustrating the first power supply circuit when all the switching elements are turned off.

When it is required to reduce both the current flowing through the radial magnetic bearing coil A (1541) and the current flowing through the radial magnetic bearing coil C (1543), the first upper-arm switching element (21*a*), the first lower-arm switching element (21*b*), the second upper-arm switching element (21*c*), and the third lower-arm switching element (210 are turned off as illustrated in FIG. 4I. That is, all the switching elements (21*a* to 210 are turned off. This allows the current to flow in the directions indicated by arrows X and Y in FIG. 4I, reducing both the current flowing through the radial magnetic bearing coil A (1541) and the current flowing through the radial magnetic bearing coil C (1543).

As described above, the control unit (23) of the first power supply circuit (20*a*) performs on-off control of the first lower-arm switching element (21*b*) and the second upper-arm switching element (21*c*) with the second lower-arm switching element (21*d*) and the third upper-arm switching element (21*e*) turned off, and thus controls the amount of current flowing through the radial magnetic bearing coil A (1541).

The control unit (23) of the first power supply circuit (20*a*) also performs on-off control of the first upper-arm switching element (21*a*) and the third lower-arm switching element (210 with the second lower-arm switching element (21*d*) and the third upper-arm switching element (21*e*) turned off, and thus controls the amount of current flowing through the radial magnetic bearing coil C (1543).

Figure 5A:
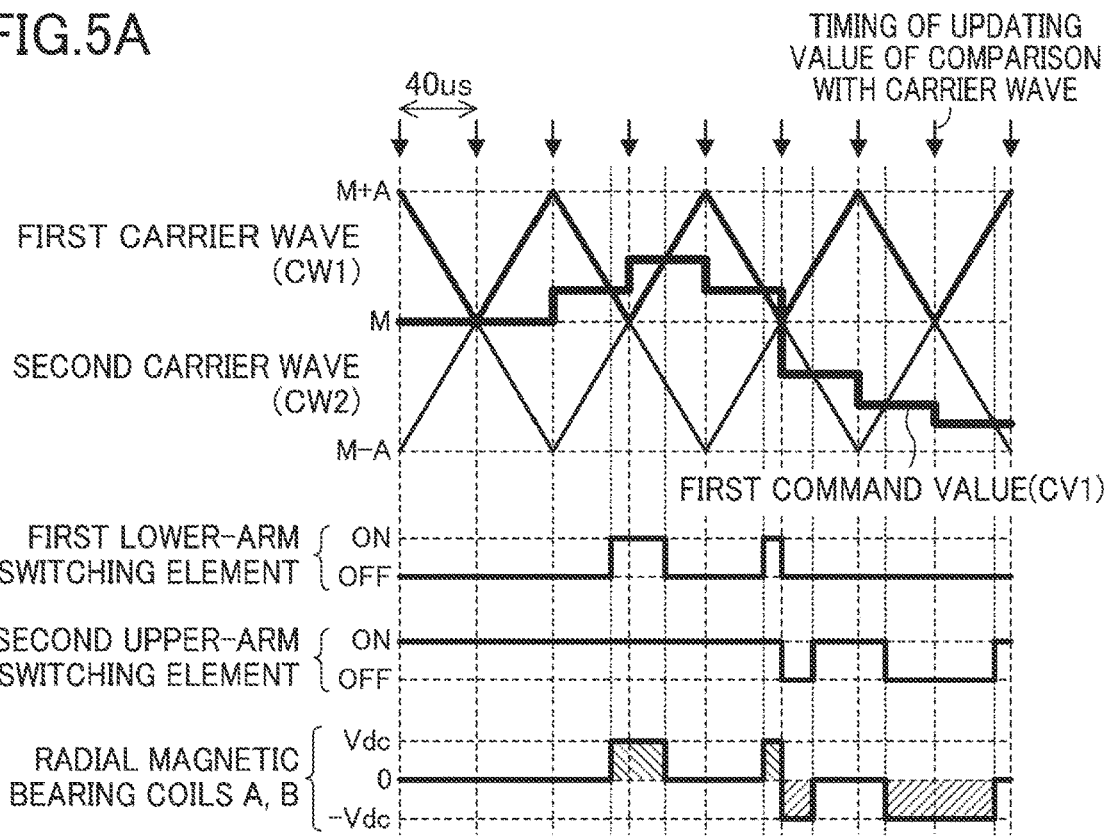
FIG. 5A is a timing chart of a first command value, first and second carrier waves, on-off states of the first lower-arm switching element and the second upper-arm switching element, and voltages applied to radial magnetic bearing coils A and B.

Specifically, as illustrated in FIG. 5A, each of the control units (23) of the first and second power supply circuits (20*a*, 20*b*) compares a first command value (CV1) with the value of a first carrier wave (CW1) to turn on the first lower-arm switching element (21*b*) when the first command value (CV1) is equal to or more than the value of the first carrier wave (CW1) or turn off the first lower-arm switching element (21*b*) when the first command value (CV1) falls below the value of the first carrier wave (CW1). The first carrier wave (CW1) has a triangular waveform with an amplitude A and a minimum value M.

The control unit (23) also compares the first command value (CV1) with the value of a second carrier wave (CW2) to turn on the second upper-arm switching element (21*c*) when the first command value (CV1) is equal to or more than the value of the second carrier wave (CW2) or turn off the second upper-arm switching element (21*c*) when the first command value (CV1) falls below the value of the second carrier wave (CW2). The second carrier wave (CW2) has a triangular waveform with an amplitude A and a maximum value M and is always 2M when added up with the first carrier wave (CW1).

Figure 5B:
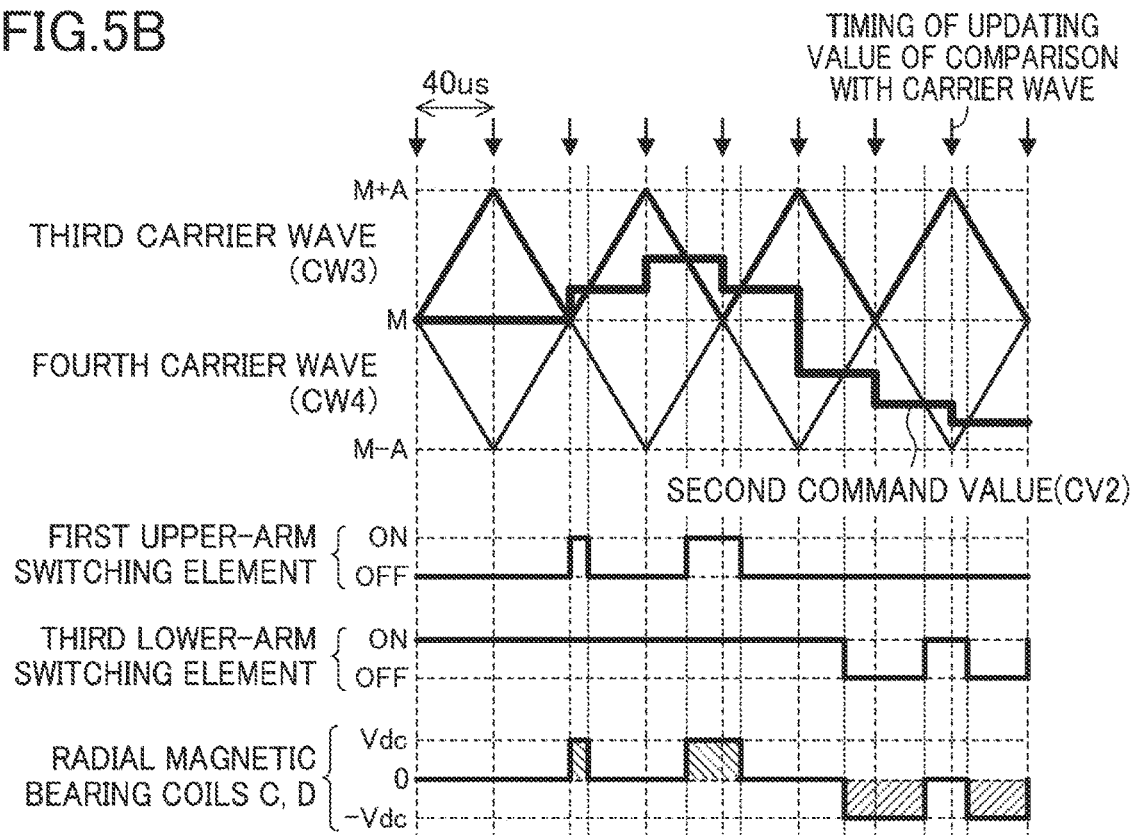
FIG. 5B is a timing chart of a second command value, third and fourth carrier waves, on-off states of the first upper-arm switching element and the third lower-arm switching element, and voltages applied to radial magnetic bearing coils C and D.

As illustrated in FIG. 5B, the control unit (23) compares a second command value (CV2) with the value of a third carrier wave (CW3) to turn on the first upper-arm switching element (21*a*) when the second command value (CV2) is equal to or more than the value of the third carrier wave (CW3) or turn off the first upper-arm switching element (21*a*) when the second command value (CV2) falls below the value of the third carrier wave (CW3). The third carrier wave (CW3) has a triangular waveform with an amplitude A and a minimum value M. The third carrier wave (CW3) is 180 degrees out of phase with the first carrier wave (CW1).

The control unit (23) also compares the second command value (CV2) with the value of a fourth carrier wave (CW4) to turn on the third lower-arm switching element (210 when the second command value (CV2) is equal to or more than the value of the fourth carrier wave (CW4) or turn off the third lower-arm switching element (210 when the second command value (CV2) falls below the value of the fourth carrier wave (CW4). The fourth carrier wave (CW4) has a triangular waveform with an amplitude A and a maximum value M and is always 2M when added up with the third carrier wave (CW3).

The first and second command values (CV1, CV2) are set every 40 µs, i.e., every time when the value of comparison with the carrier wave is updated, in accordance with the value detected by the gap sensor (not shown) that detects the gap between the stator (132) and the rotor (133) so that the sum of the first and second command values (CV1, CV2) is less than 2M+A.

The cycle of the first to fourth carrier waves (CW1 to CW4) is 80 µs.

Thus, the control unit (23) can perform on-off control of the first and second upper-arm switching elements (21*a*, 21*c*) and the first and third lower-arm switching elements (21*b*, 210 based on the first and second command values (CV1, CV2).

The sum of the first and second command values (CV1, CV2) is less than 2M+A, and the third carrier wave (CW3) is 180 degrees out of phase with the first carrier wave (CW1). Thus, the first upper-arm switching element (21*a*) and the first lower-arm switching element (21*b*) are not simultaneously turned on. This can keep the positive and negative sides of the DC voltage source (2) from causing a short circuit due to the simultaneous turn-on of the first upper-arm switching element (21*a*) and the first lower-arm switching element (21*b*). The currents flowing through the radial magnetic bearing coils A and C (1541, 1543) can be continuously increased, improving the response.

Each of the thrust magnetic bearing devices (16) includes a pair of thrust magnetic bearing electromagnets (161) and a third power supply circuit (162). The thrust magnetic bearing electromagnets (161) are arranged to sandwich the disc portion (131*a*) in the axial direction. Each of the thrust magnetic bearing electromagnets (161) has a thrust magnetic bearing coil (161*a*) as an actuator coil. The thrust magnetic bearing coils (161*a*) support the disc portion (131*a*) of the drive shaft (131) in a non-contact manner by the electromagnetic forces generated when the current flows through the thrust magnetic bearing coils (161*a*). The thrust magnetic bearing coils (161*a*) are arranged to face each other so that the electromagnetic forces of the thrust magnetic bearing coils (161*a*) act in opposite directions during control by a control unit (23) of the third power supply circuit (162). The third power supply circuit (162) is configured in the same manner as the first and second power supply circuits (20*a*, 20*b*). The third power supply circuit (162) controls the current flowing through the thrust magnetic bearing coils (161*a*) based on the value detected by the gap sensor (not shown) capable of detecting the gap between the disc portion (131*a*) and each thrust magnetic bearing electromagnet (161), and thus controls the axial position of the disc portion (131*a*) of the drive shaft (131).

Thus, in this embodiment, the common first leg (211) of the first power supply circuit (20*a*) is used to control the currents flowing through the radial magnetic bearing coils A and C (1541, 1543), and no H-bridge circuit is necessary for each of the radial magnetic bearing coils A and C (1541, 1543). This reduces the number of switching elements of the first power supply circuit (20*a*) used to control the currents flowing through the radial magnetic bearing coils A and C (1541, 1543), reducing the size and cost of the first power supply circuit (20*a*).

Likewise, the common first leg (211) of the second power supply circuit (20*b*) is used to control the currents flowing through the radial magnetic bearing coils B and D (1542, 1544), and no H-bridge circuit is necessary for each of the radial magnetic bearing coils B and D (1542, 1544). This reduces the number of switching elements of the second power supply circuit (20*b*) used to control the currents flowing through the radial magnetic bearing coils B and D (1542, 1544), reducing the size and cost of the second power supply circuit (20*b*).

Likewise, the common first leg (211) of the third power supply circuit (162) is used to control the currents flowing through the pair of thrust magnetic bearing coils (161*a*), and no H-bridge circuit is necessary for each of the thrust magnetic bearing coils (161*a*). This reduces the number of switching elements of the third power supply circuit (162) used to control the currents flowing through the thrust magnetic bearing coils (161*a*), reducing the size and cost of the third power supply circuit (162).

In each of the first to third power supply circuits (20*a*, 20*b*, 162), the first to third legs (211 to 213) are housed in a single package, and thus the first to third power supply circuits (20*a*, 20*b*, 162) can be further downsized as compared with when the first to third power supply circuits (20*a*, 20*b*, 162) are housed in two or more packages.

The number of legs (211 to 213) provided for each of the first to third power supply circuits (20*a*, 20*b*, 162) is three, and an IGBT module having three legs housed in a single package for three-phase alternating current is generally commercially available at low cost. Thus, use of the legs in such a commercially available IGBT as the first to third legs (211 to 213) easily reduces the cost of the first to third power supply circuits (20*a*, 20*b*, 162).

In the first power supply circuit (20*a*), a short circuit occurs between the positive and negative sides of the DC voltage source (2) when the first upper-arm switching element (21*a*) and the first lower-arm switching element (21*b*) are simultaneously turned on, and thus the currents flowing through the radial magnetic bearing coils A and C (1541, 1543) cannot be increased simultaneously. However, in this embodiment, the radial magnetic bearing coils A and C (1541, 1543) are arranged to act the electromagnetic forces in the opposite directions. This allows the electromagnetic forces of the radial magnetic bearing coils A and C (1541, 1543) to move the drive shaft (131) in two opposite directions (two directions parallel to the y-axis in FIG. 2) without simultaneously increasing the currents flowing through the radial magnetic bearing coils A and C (1541, 1543).

Likewise, in the second power supply circuit (20*b*), a short circuit occurs between the positive and negative sides of the DC voltage source (2) when both of the first upper-arm switching element (21*a*) and the first lower-arm switching element (21*b*) are turned on, and thus the currents flowing through the radial magnetic bearing coils B and D (1542, 1544) cannot be increased simultaneously. However, in this embodiment, the radial magnetic bearing coils B and D (1542, 1544) are arranged to act the electromagnetic forces in the opposite directions. This allows the electromagnetic forces of the radial magnetic bearing coils B and D (1542, 1544) to move the drive shaft (131) in two opposite directions (two directions parallel to the x-axis in FIG. 2) without simultaneously increasing the currents flowing through the radial magnetic bearing coils B and D (1542, 1544).

Likewise, in the third power supply circuit (162), a short circuit occurs between the positive and negative sides of the DC voltage source (2) when both of the first upper-arm switching element (21*a*) and the first lower-arm switching element (21*b*) are turned on, and thus the currents flowing through the thrust magnetic bearing coils (161*a*) cannot be increased simultaneously. However, in this embodiment, the thrust magnetic bearing coils (161*a*) are arranged to act the electromagnetic forces in the opposite directions. This allows the electromagnetic forces of the thrust magnetic bearing coils (161*a*) to move the drive shaft (131) in two directions parallel to the opposing directions of the thrust magnetic bearing coils (161*a*) without simultaneously increasing the currents flowing through the thrust magnetic bearing coils (161*a*).

In this embodiment, each of the first to third power supply circuits (20*a*, 20*b*, 162) supplies power to a pair of coils (1541 to 1544, 161*a*) arranged to act the electromagnetic forces in two opposite directions parallel to the common shaft. However, the power may be supplied to a pair of coils arranged to act the electromagnetic forces in directions parallel to different shafts.

In the first to third power supply circuits (20*a*, 20*b*, 162), the second lower-arm switching element (21*d*) and the third upper-arm switching element (21*e*) are always turned off by the control unit (23), and thus may not be provided.

In this embodiment, the first to third upper-arm switching elements (21*a*, 21*c*, 21*e*) and the first to third lower-arm switching elements (21*b*, 21*d*, 21*f*) of the first to third power supply circuits (20*a*, 20*b*, 162) are constituted of IGBTs, but may be constituted of metal oxide semiconductor field effect transistors (MOSFETs).

In the first to third power supply circuits (20*a*, 20*b*, 162), the first to third upper-arm freewheeling diodes (22*a*, 22*c*, 22*e*) and the first to third lower-arm freewheeling diodes (22b, 22d, 220) may be constituted of built-in diodes of IGBTs or body diodes of MOSFETs.

Although the present invention has been applied to the radial magnetic bearing coils A to D (1541 to 1544) that support the drive shaft (131) of the motor (13) in this embodiment, the present invention can also be applied to an actuator coil that supports an object other than the drive shaft (131) of the motor (13) in a non-contact manner by the electromagnetic force.

As can be seen in the foregoing, the present disclosure is useful for a power supply circuit that supplies a current from a DC voltage source to first and second actuator coils so that the first and second actuator coils support an object by an electromagnetic force in a non-contact manner, and a bearing device including the power supply circuit.

The invention claimed is:

1. A power supply circuit that supplies a current from a DC voltage source to first and second actuator coils so that the first and second actuator coils support an object in a non-contact manner by an electromagnetic force, the power supply circuit comprising:
   a first leg having a first upper-arm switching element and a first lower-arm switching element connected in series to each other, the first leg being connected to the DC voltage source; and
   a control unit configured to turn the first upper-atm switching element and the first lower-arm switching element on and off to control the current supplied to the first and second actuator coils,
   the first and second actuator coils being connected in series to each other,
   a midpoint between the first upper-arm switching element and the first lower-arm switching element being connected to a connection point between the first and second actuator coils,
   a freewheeling diode being provided for each of the first upper-arm switching element and the first lower-arm switching element in parallel, and
   the control unit being configured to perform control so that
      the current flows through the first actuator coil in a direction toward the connection point and
      the current flows through the second actuator coil in a direction coming out of the connection point.

2. The power supply circuit of claim 1, further composing:
   a second leg having a second lower-arm freewheeling diode and a second upper-arm switching element connected in series to the second lower-arm freewheeling diode via a cathode, the second leg being connected to the DC voltage source; and
   a third leg having a third upper-arm freewheeling diode and a third lower-arm switching element connected in series to the third upper-arm freewheeling diode via an anode, the third leg being connected to the DC voltage source,
   the first actuator coil being connected between
      the midpoint between the first upper-arm switching element and the first lower-arm switching element and
      a midpoint between the second upper-arm switching element and the second lower-arm freewheeling diode, and
   the second actuator coil being connected between
      the midpoint between the first upper-arm switching element and the first lower-arm switching element and
      a midpoint between the third upper-arm freewheeling diode and the third lower-arm switching element.

3. The power supply circuit of claim 2, wherein the first to third legs are housed in a single package.

4. The power supply circuit of claim 2, wherein the control unit is configured to perform control by
   comparing a first command value with a value of a first carrier wave that has a triangular waveform with an amplitude A and a minimum value M to
      turn on the first lower-arm switching element when the first command value is equal to or more than the value of the first carrier wave or
      turn off the first lower-arm switching element when the first command value falls below the value of the first carrier wave,
   comparing the first command value with a value; of a second carrier wave that has an amplitude A and a maximum value NI and is always 2M when added up with the first carrier wave to
      turn on the second upper-arm switching element when the first command value is equal to or more than the value of the second carrier wave or
      turn off the second upper-arm switching element when the first command value falls below the value of the second carrier wave,
   comparing a second command value with a value of a third carrier wave that has a triangular waveform with an amplitude A and a minimum value M to
      turn on the first upper-arm switching element when the second command value is equal to or more than the value of the third carrier wave or
      turn off the first upper-arm switching element when the second command value falls below the value of the third carrier wave, and
   comparing the second command value with a value of a fourth carrier wave that has an amplitude A and a maximum value NI and is always 2M when added up with the third carrier wave to
      turn on the third lower-arm switching element when the second command value is equal to or more than the value of the fourth carrier wave or
      turn off the third lower-arm switching element when the second command value falls below the value of the fourth carrier wave.

5. The power supply circuit of claim 4, wherein
   the sum of the first and second command values is less than 2M+A, and
   the third carrier wave is 180 degrees out of phase with the first carrier wave.

6. A bearing device including the power supply circuit of claim 1 and the first and second actuator coils, wherein
   the object is a drive shaft of a motor that is rotationally driven, and
   the first and second actuator coils are arranged so that electromagnetic forces of the first and second actuator coils act in opposite directions during the control by the control unit.

7. The power supply circuit of claim 3, wherein
   the control unit is configured to perform control by
      comparing a first command value with a value of a first carrier wave that has a triangular waveform with an amplitude A and a minimum value M to
         turn on the first lower-arm switching element when the first command value is equal to or more than the value of the first carrier wave or turn off the first lower-arm switching element when the first command value falls below the value of the first carrier wave, comparing the first command value with a value of a second carrier wave that has an amplitude A and a maximum value M and is always 2M when added up with the first carrier wave to turn on the second upper-arm switching element when the first command value is equal to or more than the value of the second carrier wave or turn off the second upper-arm switching element when the first command value falls below the value of the second carrier wave, comparing a second command value with a value of a third carrier wave that has a triangular waveform with an amplitude A and a minimum value M to turn on the first upper-atm switching element when the second command value is equal to or more than the value of the third carrier wave or turn off the first upper-arm switching element when the second command value falls below the value of the third carrier wave, and comparing the second command value with a value of a fourth carrier wave that has an amplitude A and a maximum value M and is always 2M when added up with the third carrier wave to turn on the third lower arm switching element when the second command value is equal to or more than the value of the fourth carrier wave or turn off the third lower-arm switching element when the second command value falls below the value of the fourth carder wave.

8. The power supply circuit of claim 7, wherein
the sum of the first and second command values is less than 2M+A, and
the third carrier wave is 180 degrees out of phase with the first carrier wave.

9. A hearing device including the power supply circuit of claim 2 and the first and second actuator coils, wherein
the object is a drive shaft of a motor that is rotationally driven, and
the first and second actuator coils are arranged so that electromagnetic forces of the first and second actuator coils act in opposite directions during the control by the control unit.

10. A bearing device including the power supply circuit of claim 3 and the first and second actuator coils, wherein
the object is a drive shaft of a motor that is rotationally driven, and
the first and second actuator coils are arranged so that electromagnetic forces of the first and second actuator coils act in opposite directions during the control by the control unit.

11. A bearing device including the power supply circuit of claim 4 and the first and second actuator coils, wherein
the object is a drive shaft of a motor that is rotationally driven, and
the first and second actuator coils are arranged so that electromagnetic forces of the first and second actuator coils act in opposite directions during the control by the control unit.

12. A bearing device including the power supply circuit of claim 5 and the first and second actuator coils, wherein
the object is a drive shaft of a motor that is rotationally driven, and
the first and second actuator coils are arranged so that electromagnetic forces of the first and second actuator coils act in opposite directions during the control by the control unit.

13. A bearing device including the power supply circuit of claim 7 and the first and second actuator coils, wherein
the object is a drive shaft of a motor that is rotationally driven, and
the first and second actuator coils are arranged so that electromagnetic forces of the first and second actuator coils act in opposite directions during the control by the control unit.

14. A bearing device including the power supply circuit of claim 8 and the first and second actuator coils, wherein
the object is a drive shaft of a motor that is rotationally driven, and
the first and second actuator coils are arranged so that electromagnetic forces of the first and second actuator coils act in opposite directions during the control by the control unit.

* * * * *